(12) United States Patent  (10) Patent No.: US 9,098,857 B1
Brown et al.  (45) Date of Patent: Aug. 4, 2015

(54) DETERMINING EFFECTIVENESS OF ADVERTISING CAMPAIGNS

(75) Inventors: Michael A. Brown, Ashburn, VA (US); Chad Maccarelli, Reston, VA (US); Walter Ramdeholl, Brampton (CA)

(73) Assignee: comScore, Inc., Reston, VA (US)

(*) Notice: Subject to any disclaimer, the term of this patent is extended or adjusted under 35 U.S.C. 154(b) by 750 days.

(21) Appl. No.: 12/698,454

(22) Filed: Feb. 2, 2010

Related U.S. Application Data (60) Provisional application No. 61/149,286, filed on Feb. 2, 2009.

(51) Int. Cl.
  *G06Q 30/00* (2012.01)
  *G06F 15/16* (2006.01)
  *G06Q 30/02* (2012.01)
  *H04L 29/08* (2006.01)

(52) U.S. Cl.
  CPC .............. *G06Q 30/02* (2013.01); *H04L 29/08* (2013.01)

(58) Field of Classification Search
  CPC ................................ G06Q 30/02; H04L 29/08
  USPC .................... 705/14.67, 14.53, 10, 14, 14.41; 709/203
  See application file for complete search history.

(56) References Cited

U.S. PATENT DOCUMENTS

| | | | |
|---|---|---|---|
| 7,050,989 B1 * | 5/2006 | Hurt et al. ................... | 705/14.51 |
| 2003/0191653 A1 | 10/2003 | Birnbaum et al. | |
| 2004/0024632 A1 | 2/2004 | Perry | |
| 2007/0038516 A1 | 2/2007 | Apple et al. | |
| 2007/0156532 A1 | 7/2007 | Nyhan et al. | |
| 2008/0086524 A1 | 4/2008 | Afergan et al. | |
| 2009/0204476 A1 | 8/2009 | Abraham et al. | |

OTHER PUBLICATIONS

U.S. Non-Final Office Action for U.S. Appl. No. 12/363,378 dated Jun. 23, 2011, 24 pages.
International Search Report and Written Opinion for corresponding International Application No. PCT/US09/32712, mailed Mar. 6, 2009, 10 pages.
PCT Notification Concerning Transmittal of International Preliminary Report on Patentability for International Application No. PCT/US2009/032712 mailed Mar. 6, 2009 (6 pages).
European Office Action for Application No. 09706005.7-2221 dated May 4, 2011, 5 pages.
Official Journal EPO, Notice from the European Patent Office dated Oct. 1, 2007 concerning business methods, pp. 592-593, XP007905525.
U.S. Final Office Action for U.S. Appl. No. 12/363,378 dated Feb. 27, 2012, 20 pages.

* cited by examiner

*Primary Examiner* — Sun Li
(74) *Attorney, Agent, or Firm* — Andrew Bodendorf (57) ABSTRACT

The effectiveness of advertisement(s) that are included in an advertising campaign may be determined by displaying a control advertisement to a control group of webpage visitors and inviting the users in the control group and/or the users exposed to the advertisement(s) that are in the campaign to complete a survey regarding the advertisement(s) or overall objectives of the campaign.

11 Claims, 8 Drawing Sheets

DETERMINING EFFECTIVENESS OF ADVERTISING CAMPAIGNS

CROSS-REFERENCE TO RELATED APPLICATIONS

This application claims priority from U.S. Provisional Application No. 61/149,286, filed Feb. 2, 2009, and titled "Determining Effectiveness of Advertising Campaigns," which is incorporated by reference.

BACKGROUND

In general, advertisers may want to maintain a control group of users that have not been exposed to an advertisement included in an advertising campaign. For instance, an advertiser that advertises on the World Wide Web using, for example, banner advertisements or interactive advertisements on web pages may want to understand the effectiveness of an advertising campaign. Having a control group may allow the advertiser, or a third party, to assess the effectiveness of the advertising campaign.

SUMMARY

In one general aspect, a request for data sent from a client computer is accessed. The request for data includes a resource location. The resource location is identified in the request for data. An advertising campaign associated with the resource location is identified by comparing the identified resource location to a list of resource locations associated with one or more advertising campaigns. The one or more advertising campaigns included standard advertisements associated with the advertising campaigns. Rules associated with the identified advertising campaign are acceded. The rules define a control group of client computers. Whether the client computer is included in the control group is determined based on the rules defining the control group and an identifier associated with the client computer. The request for data is modified to include a control parameter indicating whether the client computer is in the control group. When the control parameter indicates that the client computer is in the control group, a control advertisement that is not associated with the identified advertising campaign is received. When the control parameter indicates that the client computer is not in the control group, a standard advertisement associated with the identified advertising campaign is received.

Implementations may include one or more of the following features. The identifier associated with the client computer may be an identifier generated by an application running on the client computer and the identifier is constant over time. The advertising server may be configured to determined, based on the control parameter, whether the client computer is in the control group. The resource location may be a URL associated with an advertising server. Accessing a request for data directed to an advertising server from a client computer may include accessing the request for data at a control application that is local to the client computer. Accessing a request for data directed to an advertising server from a client computer may include accessing the request for data at an ISP associated with the client computer.

In another general aspect, an application is received from an advertising server. The application is referenced from a web page downloaded to the client computer. The application is executed at the client computer, and executing the application causes the following operations to be performed by the application: accessing an identifier of the client computer, the identifier being maintained by a panel application running on the client computer; determining, based on the identifier and predefined rules, whether the client computer is a member of the control group; causing presentation of a standard advertisement when the client computer is not a member of the control group, the standard advertisement being included in an advertising campaign; and causing presentation of a control advertisement when the client computer is not a member of the control group, the control advertisement not being included in the advertising campaign.

Implementations may include one or more of the following features. Receiving the application from the advertising server may include receiving an advertising container, and causing presentation of the standard advertisement may include causing the advertising container to display the standard advertisement. The standard advertisement and the control advertisement may be precompiled with the advertising container. An indicia of whether the client computer is included in the control group may be passed from the application to the advertising container.

Implementations of any of the techniques described above may include a method or process, an apparatus, a machine, a system, or instructions stored on a computer-readable storage device. The details of particular implementations are set forth in the accompanying drawings and description below. Other features will be apparent from the following description, including the drawings, and the claims.

DETAILED DESCRIPTION

The effectiveness of an advertisement(s) that is included in an advertising campaign may be determined by displaying a control advertisement to a control group of webpage visitors and inviting the users in the control group and/or the users exposed to the advertisement(s) that are in the campaign to complete a survey regarding the advertisement(s) or overall objectives of the campaign. Using the techniques discussed below, the effectiveness of the advertising campaign may be determined without interfering with or modifying the advertising content (e.g., the ad creative or associated Hypertext Mark-Up Language (HTML) or other code for displaying the advertisement) delivered to a client computer from an advertising server.

The control group of visitors may be assembled based on a target number of users expected to be exposed to a campaign advertisement. The visitors may be users of a client computer and/or automated processes running on the client computer. The control group of visitors may be a control group of client computers. The determination of whether a particular client computer is included in the control group may be made by a control application that has access to some or all of the requests for data made by the client computers and responses received by the client computers.

As discussed in more detail below, the control group of client computers may be a variable group of client computers within a panel of client computers. The panel of client computers may be a group of computers that have a panel application installed on the client computer. The panel application may collect information about requests for data made by the client computers and responses received by the client computers and send that information to a collection server for analysis. The control application used to determine whether a client computer is part of the control group may be designed as part of the panel application.

The control application may modify particular requests for advertisements made from the client computer such that the requests indicate to an advertising server whether the client computer is in the control group. The advertising server analyzes the request for the advertisement and returns a control advertisement if the client computer is in the control group or a standard advertisement included in the advertising campaign if the client computer is not in the control group. The control advertisement is an advertisement or other content that is not included in the advertising campaign. Surveys given to users whose client computer is in the control group and/or outside of the control group can then be used to determine the effectiveness of the advertising campaign, for example, by being designed to assess the impact of the advertisement(s) in the campaign on the users that have been exposed to these advertisement(s). In this manner, the effectiveness of the advertisements included in the advertising campaign may be determined without modifying or otherwise interfering with the advertising content that is delivered to the client computer from the advertising survey.

An advertising campaign includes one or more advertisements, and the advertisements each have an associated resource location, which is indicated, for example, by a Uniform Resource Locator (URL). Advertising campaigns may have a particular subject matter focus and may include advertisements related to that subject matter focus. For example, an advertising campaign may include advertisements related to a particular corporate entity, a product or family of products, and/or a brand or family of brands. As discussed in more detail below, the control group for a particular advertising campaign may be defined by a set of rules that specify URLs associated with the advertisements included in the advertising campaign and parameters that define the control group. The rules may be used to segment the client computers included in the panel of client computers into those client computers that are included in the control group for a particular advertising campaign and those client computers that are not included in the control group for the campaign. Those client computers that are not part of the panel may always receive the advertisement associated with the campaign. The panel of client computers may be segmented differently for each advertising campaign.

The control application may analyze a request for an advertisement made from the client computer and an identifier associated with the client computer to determine whether a client computer is in the control group for a particular advertising campaign. The control application may then append, insert, or otherwise add a control parameter to the request made from the client computer to indicate whether the client computer is in the control group. The request is forwarded to a content resource, such as, for example, an advertising server. Upon receiving the request, the advertising server may analyze the request to obtain the control parameter and return a control advertisement if the requesting client computer is in the control group (as indicated by the control parameter). The control application may be local to the client computer. In some implementations, the control application may be remote from the client computers. For example, a proxy server located at one or more Internet Service Providers (ISPs) through which the client computers request and receive data may execute the control application.

In some implementations, an application and an advertising container are downloaded to a client computer from an advertising server. The downloaded application determines whether the client computer is in the control group, for example, based on an identifier associated with the client computer and/or a panel application installed on the client computer. The downloaded application instructs the advertising container to display a control advertisement or a standard advertisement depending on whether the client computer is included in the control group.

Figure 1A:
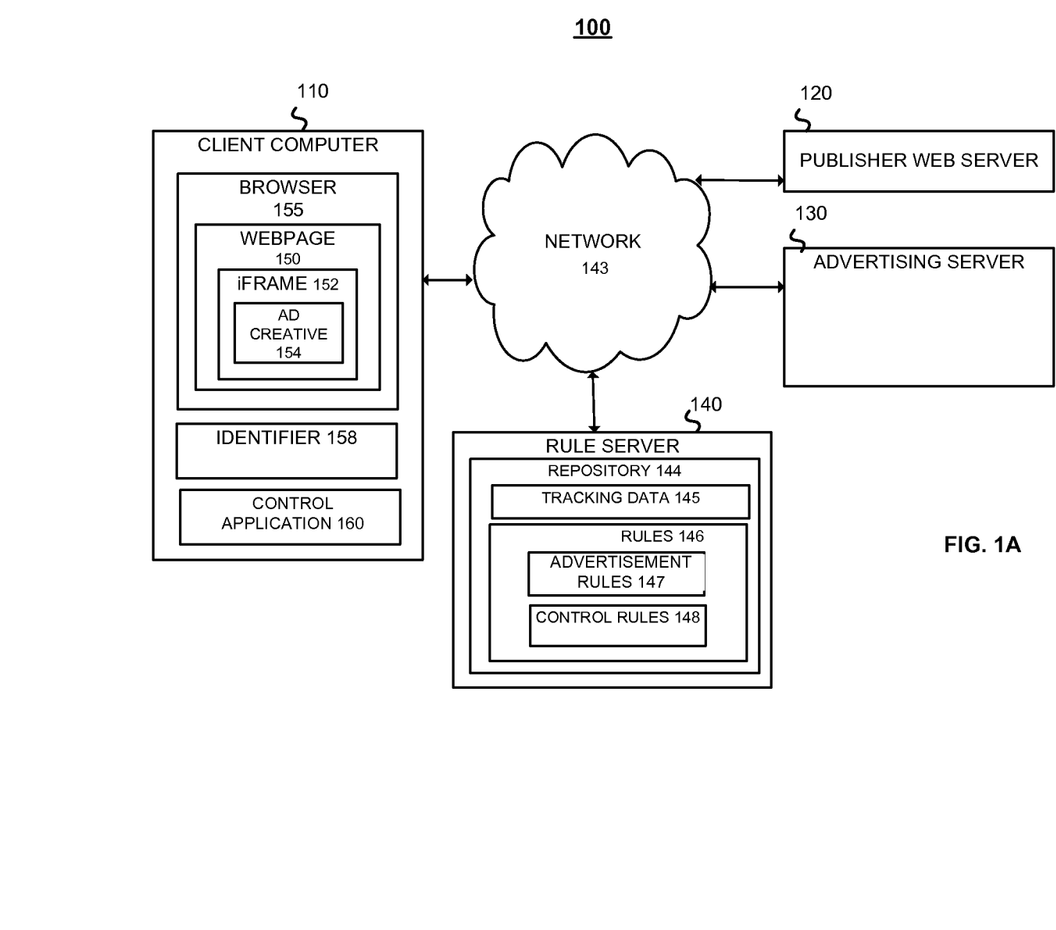
FIG. 1A shows an example block diagram of a system for maintaining a control group.

Referring to FIG. 1A, in one implementation, a system 100 includes a client computer 110, a publisher web server 120, an advertising server 130, and a rule server 140 that communicate and exchange data through a network 143. In particular, the system 100 may be used to provide advertisements to the client computer 110 and to determine whether the client computer 110 is included in a control group for a particular advertising campaign. As discussed in more detail with respect to FIGS. 5 and 6, the client computer 110 may be included in a panel of two or more client computers running a panel application. In this case, the control application 160 may be implemented as part of the panel application.

The control group may include client computers (such as the client computer 110) to which an advertisement associated with the advertising campaign will not be presented. An advertisement that is not included in the advertising campaign (a control advertisement) is presented on the client computers 110 that are in control group, while advertisements that are included in the advertising campaign (which may be referred to as standard advertisements) are presented on client computers that are not in the control group. The control advertisement and the standard advertisement may be stored on the advertising server 130 or otherwise accessible to the advertising server 130. A survey may be presented at the client computer 110 concurrently with, or shortly after, the display of the advertisement (either control advertisement or standard advertisement). In some implementations, the survey may be presented both concurrently with the advertisement and after the display of the advertisement.

The client computer 110 includes a browser 155, which displays a webpage 150. An identifier 158 is associated with the client computer 110 and distinguishes the client computer from among other client computers that have the control application 160 installed. The identifier 158 deterministically segments the client computers into control and non-control groups. The identifier 158 is a segmentable identifier that may be a globally unique identifier in some implementations. In some implementations, the identifier 158 may not be globally unique, but the identifier 158, or portions of the identifier 158, may be used to distinguish the client computer 110 from among the other client computers in the panel of client computers. As discussed in greater detail below, a control application 160 determines whether the client computer 110 is included in the control group. The control application 160 may also generate and/or maintain the identifier 158.

Figure 1B:
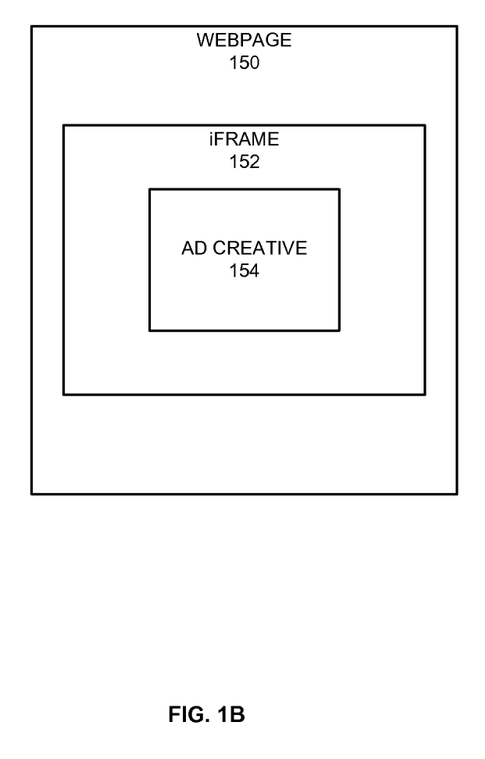
FIG. 1B shows an example block diagram of a webpage.

In one example, the client computer 110 requests a webpage 150 from the publisher web server 120. The publisher web server 120 serves the webpage 150 for rendering in a browser 155 on the client computer 110. Referring briefly to FIG. 1B, an illustration of the webpage 150 is shown. The webpage 150 includes a container or placeholder for content (such as an advertisement). The container or placeholder may be an HTML element that allows an HTML document to be embedded within another HTML document. In some implementations, the container or placeholder is an iFrame 152, which may be located in a portion of the webpage 150 reserved for displaying an advertisement. The iFrame 152 acts as a container, or placeholder, for content and the iFrame 152 includes a reference (e.g., a uniform resource locator (URL)), or a pointer, to the advertising server 130, which returns an advertising creative 154 for display in the iFrame 152. Through the reference to the advertising server 130, the iFrame 152 obtains a particular advertising creative 154 for display within the iFrame 152 from the advertising server 130. The advertising creative 154 may be, for example, an image, a shockwave application, a Java script, or a Java applet.

Returning to FIG. 1A, the system 100 also includes the rule server 140, which includes the repository 144. The repository 144 may be implemented on any type of machine-readable medium capable of storing data, including instructions that cause one or more processing devices to perform operations. The data stored in the repository 144 may include tracking data 145 and rules 146. The tracking data 145 may include a record of which advertisements have been transmitted, received, or presented on the client computer 110. The rules 146 may include advertisement rules that specify advertisement identifiers 147 (such as, for example, URLs associated with advertisements that are included in a particular advertising campaign) and control rules 148 that define control groups for the advertising campaigns. The rules 146 may be, for example, one or more XML files.

The control rules 148 may include an amount of client computers to include in the control group for a particular advertising campaign, a number of client computers to include, and/or a percentage of the client computers in the panel of client computers to include in the control group. The control rules 148 also may specify heuristics that can be applied to the identifier 158 associated with the client computer 110 to determine whether the client computer 110 is included in the control group. For example, if twenty percent of the client computers in the panel are to be included in the control group, and the identifiers associated with the client computers included in the panel of client computers all begin with a digit between "0" and "9," the control rules 148 may specify that client computers having identifiers of either "0" or "1" be included in the control group. In some implementations, a client computer may be excluded from the control group because the user is on a list of client computers on which certain advertisements are not presented (e.g., a blacklist) or because the client computer is running a spider process. Client computers that do not have the control application 160 installed are not part of the control group.

The control application 160 has access to requests for data made by the client computer 110. In some implementations, the control application 160 acts as a local proxy that is installed on the client computer 110. In these implementations, the control application 160 intercepts requests for data made by the client computer 110 or the browser 155 or forwards the requests to the resource location indicated by the request for data. In other implementations, the control application 160 monitors the network traffic sent by or received by the client computer 110 without actually intercepting the traffic. In these implementations, the control application 160 may be considered to monitor the network traffic, and the control application 160 may access and analyze parts or all of the network traffic; however, the control application 160 does not necessarily intercept the network traffic.

Although in the example shown in FIG. 1A, the control application 160 is local to the client machine 110, this is not necessarily the case. For example, in some implementations, the control application 160 may be implemented remotely from the client computer 110. In these implementations, the control application 160 may be located at, for example, an Internet Service Provider (ISP) through which the client computer 110 connects to the network 143. In these implementations, the control application 160 may be, for example, a transparent proxy that receives requests for data from the client computer 110 and forwards the requests for data to a resource location specified in the request for data. In these implementations, the identifier 158 may be maintained by the ISP, or other provider of the transparent proxy, rather than necessarily being stored locally on the client machine 110. In some implementations, the system 100 may include more than one ISP that operate a transparent proxy.

The control application 160 also accesses, generates, or maintains an identifier 158 associated with the client computer 110, and the control application uses the identifier 158 to determine whether the client computer 110 is included in the control group. To determine whether a particular client computer 110 is in the control group for a given advertising campaign, the control application 160 accesses rules 146. The rules 146 specify URLs that are associated with the advertisements included in the advertising campaign and parameters to define a control group for the advertising campaign. The rules 146 may be stored on the rule server 140 so that multiple client computers may access the rules 146. However, the control application 160 downloads or otherwise receives the rules 146 and may store a version of the rules 146 locally.

The control application 160 analyzes a URL within a request for data made from the client computer 110 and compares the URL to those in the advertisement rules 147. If the requested URL matches one in the rules 146, the control application 160 analyzes the identifier 158 of the client computer 110 using the control rules 148 to determine whether the client computer 110 is in the control group for the advertising campaign in which the URL is included. The control application may then modify the request for the URL to include an indicator of whether or not the client computer 110 is or is not in the control group. The advertising server 130 may use this indicator to determine whether the advertising creative 154 returned to the client computer 110 is a control advertisement or a standard advertisement.

The rules 146 may be updated at the rule server 140 to account, for example, for changes to the advertising campaigns. In some implementations, the control application 160 periodically requests the rules 146 from the rule server 140 to ensure that the control application 160 is using the most current version. In some implementations, the rules 146 are pushed from the rule server 140 to the control application 160 when a change is made to the rules 146. In implementations where the control application 160 is local to the client computer 110, such as the one shown in FIG. 1A, the rules 146 may be updated at all control applications running on all client computers in order to maintain consistent rules across the included client computers. Although the repository 144 is shown in FIG. 1A as being integrated with the rule server 140, the repository may be located elsewhere. For example, the repository 144 may be located on a central server that exchanges data with the control server 140.

Figure 2:
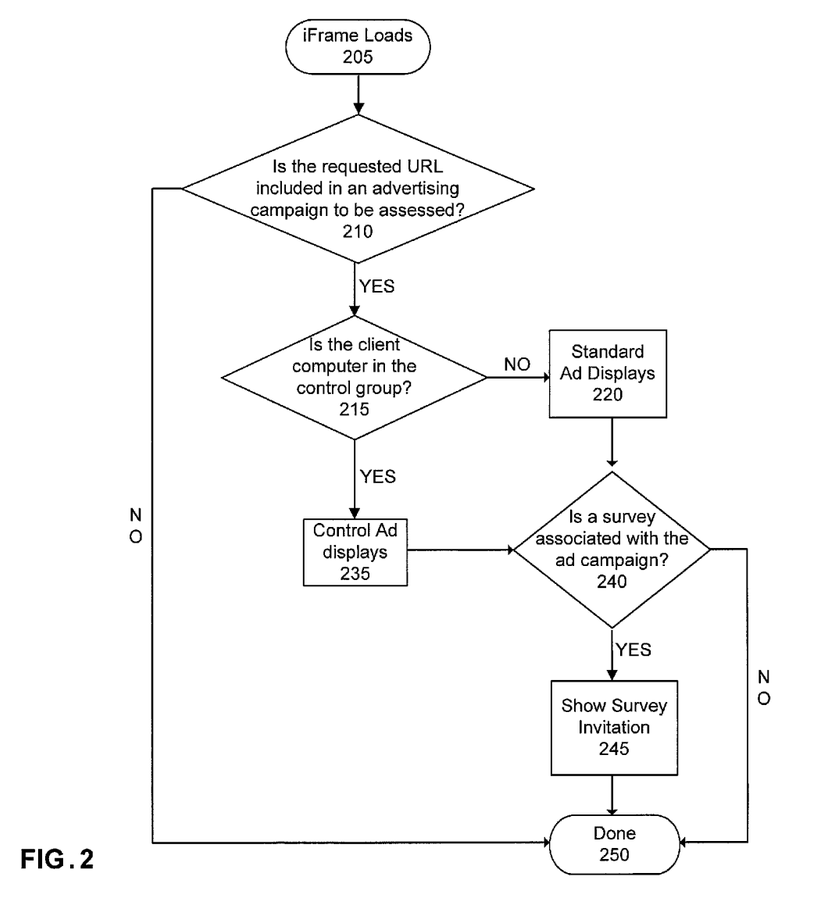
FIG. 2 shows an example process for determining a control group of webpage visitors.

Referring to FIG. 2, an example process 200 is shown. The example process 200 may be used to maintain a control group and determine the effectiveness of an advertising campaign. The process 200 may be performed by a processor included on a client computer, such as the client computer 110 discussed above with respect to FIG. 1A.

An inline frame ("iFrame") loads (205). The iFrame may be similar to the iFrame 152 discussed above with respect to FIG. 1A. The iFrame is loaded within a webpage, such as the webpage 150 discussed above with respect to FIG. 1, that is rendered on a user's computer in response to a request made by the client computer for a webpage located at a publisher web server. The webpage requested by the client computer is rendered by a browser application running on the user's computer, and the rendered webpage includes the iFrame. An iFrame is a HyperText Markup Language (HTML) element that may embed another HTML document inside a main HTML document. The iFrame may include a reference, such as a URL, to a content source, such as an advertising server. Rendering the iFrame results in a request being sent from the client computer for the resource located at the URL.

Whether the URL is included in the advertisement campaign to be assessed is determined (210). If the URL is part of an advertising campaign to be assessed, the request for data is subsequently modified, as discussed below, to indicate whether or not the client computer is in a control group for the advertising campaign. Whether the URL is in a campaign to be assessed is determined by a control application (such as the control application 160 discussed with respect to FIG. 1A) that has access to requests for data made from the client computer. In particular, the control application identifies a URL, or other resource location, in the request for data. To determine whether the URL is included in an advertising campaign, the identified URL is compared to the URLs in the rules (such as advertisement rules 147) to determine whether the URL matches a URL of an advertisement known to be included in an advertising campaign to be assessed. If the identified URL matches a URL of an advertisement included in the advertising campaign, the requested URL is included in an advertising campaign and the request for data is modified as discussed below. If the requested URL does not match a URL in the advertisement rules, the URL is not part of an advertising campaign, and the process 200 terminates. For example, the client computer may make a request for www.abcdef.com, and the advertisement rules include www.abcdef.com as one of multiple URLs associated with an advertisement campaign to be assessed.

If the URL is included in an advertising campaign to be assessed, whether the client computer is a member of the control group is determined (215). Whether the client computer is a member of the control group is determined by the control application. There may be a desired amount of users to be included in the control group. The desired amount of users may, for example, be expressed as a percentage of the total number of users expected to be exposed to the standard advertisement. In some implementations, the desired amount of users may be expressed as a number of users.

The control application may determine whether the client computer is a member of the control group by analyzing an identifier, such as identifier 158. To that end, the control application accesses rules (such as the rules 146 discussed above with respect to FIG. 1A) that define control groups for the advertising campaign with which the requested URL is associated and, particularly, define the rules for using the identifier to determine whether the client computer is a member of the control group for the requested URL. Continuing the above example, the client computer may make a request for www.abcdef.com and the client computer may be associated with the identifier "0BNR$%." If twenty percent of the client computers in the panel are to be included in the control group for the advertising campaign that includes the URL www.abcdef.com, and the identifiers associated with the client computers included in the panel of client computers all begin with a digit between "0" and "1," the client computer is included in the control group for the advertising campaign.

Once it is determined that the client computer is included in the control group, a control parameter is appended, inserted, or otherwise added to the request for data by the control application before the request for data is sent to the advertising server. The control parameter indicates to the advertising server whether the client computer is a member of the control group or not. The advertising server analyzes the modified request for data to identify the control parameter. The advertising server returns the standard advertisement to the client computer if the client computer is not in the control group and the control advertisement to the client computer if the client computer is included in the control group.

The control parameter may be, for example, a character, string, number, or flag that indicates whether the client computer is in the control group. For example, a control parameter of "Y" may indicate that the client computer is include in the control group and a control parameter of "N" may indicate that the client computer is not included in the control group. The control parameter may be appended to the end of the request for data, added to the beginning of the request for data, or inserted into the request for data. The placement of the control parameter with respect to the request for data may be pre-defined and agreed upon by the entity controlling the advertising server so that the advertising server is able to located and analyze the control parameter within received requests for data.

If the control parameter indicates that the user is not a member of the control group, the advertising server returns the standard advertisement and the standard advertisement is presented in the iFrame (220). In some implementations, the inclusion of the client computer in the control group is tracked by a rule server (such as the rule server 140) in information such as the tracking data 145 discussed with respect to FIG. 1A. This information may be transmitted as part of the information transmitted by the panel application when a panel application is installed. If the control parameter indicates that the user is a member of the control group, the advertising server returns the control advertisement and the control advertisement is presented in the iFrame (235).

It is determined whether a survey is associated with the advertisement presented on the client computer (240). If there is not a survey associated with the advertisement, the process 200 terminates (250). If there is a survey associated with the advertisement, an invitation to participate in the survey may be presented (255).

The survey may be generated by the control application, and the control application may include rules or logic to generate surveys that are customized for a particular campaign. The control application may present the survey in a browser running on the client computer (such as the browser 155). In some implementations, the advertising survey may serve the survey to the client computer. Additionally, before presenting the survey, it may be determined whether a survey quota has been satisfied. For example, the survey quota may be satisfied when a threshold number of users has completed the survey or a predetermined percentage of users has completed the survey. If the survey quota has not been satisfied, the control application may present the survey or, in implementations in which the advertising server serves the survey, the advertising server sends a response to the control application indicating that the survey is to be shown with the advertisement.

The survey may be displayed adjacent to the advertisement (e.g., the survey may appear below the advertisement, on either side of the advertisement, or on the advertisement). The survey may be displayed after the advertisement is displayed in order to allow the user to focus attention on the advertisement and form an opinion prior to completing the survey. For example, the display of the survey may occur 4-5 seconds after the display of the advertisement. In this manner, the user views the advertisement without interference with the appearance of the survey. As discussed above, in some implementations, if the quota has not been satisfied, an invitation to participate in the survey is shown (245). In some implementations, the survey is shown only if the invitation is accepted by the user, and, in some implementations, the survey is shown with the advertisement regardless of whether the invitation is displayed and/or selected. The user may be given the option to dismiss the survey rather than complete the survey in some implementations. Similarly, a survey may be provided to users that receive the standard advertisement.

In some implementations, the invitation to participate in the survey is shown only if the client computer is in the control group, and in some implementations, the invitation to participate is shown only if the client computer is not in the control group. In some implementations, the invitation to participate is shown to the client computer regardless of whether the client computer is in the control group or not in the control group. Additionally, the survey may be shown or not shown on the client computer regardless of whether an invitation to participate is presented.

Figure 3A:
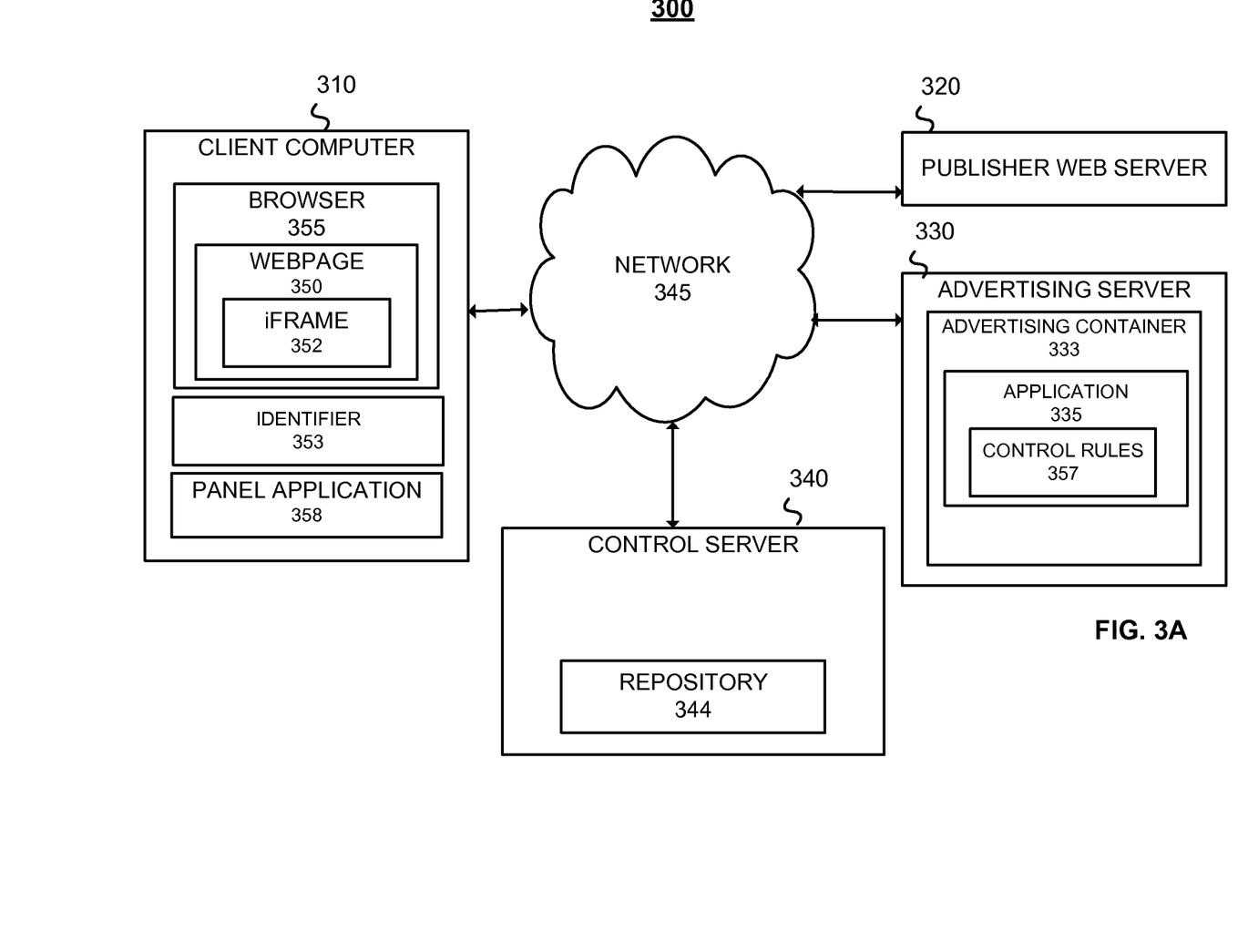
FIG. 3A shows an example block diagram of a system for maintaining a control group.

Referring to FIG. 3A, an additional example of a system 300 for determining effectiveness of an advertising campaign is shown. The system 300 includes a client computer 310, a publisher web server 320, an advertising server 330, and a control server 340 that communicate and exchange data through a network 345. In particular, the system 300 may be used to provide advertisements to users and to determine whether the client computer 310 is included in a control group. The members of the control group may be exposed to a control advertisement (which is not the advertisement included in the advertising campaign) and some or all of the members may be given the opportunity to participate in a survey regarding the advertisement. The control advertisement may be stored on the advertising server 330. The survey may be provided concurrently with, or shortly after, the display of the advertisement. Users that are not in the control group are exposed to the standard advertisement that is part of the advertising campaign. Some of those users also may be given a survey.

To maintain the control group, an application 335 is downloaded with a requested webpage to a user's computer and determines whether to include the client computer in the control group. An advertising container 333 that has logic to display an advertisement appropriate to the group to which the client computer 310 belongs is also downloaded to the client computer 310 with the application 335. The advertising container 333 calls the application 335 and, in response, the application 335 returns a value to the advertising container 333 that indicates whether the client computer 310 belongs to the control group. The advertising container 333 displays the control advertisement when the client computer 310 is in the control group and a standard advertisement when the client computer 310 is not in the control group. The advertising container 333 may include compiled standard advertisements and control advertisements for display. In some implementations, the advertising container 333 includes URLs that reference standard advertisements and URLs that reference control advertisements. In these implementations, the advertising container 333 retrieves the appropriate advertisement for display at the client computer 310 from the referenced URL.

Figure 3B:
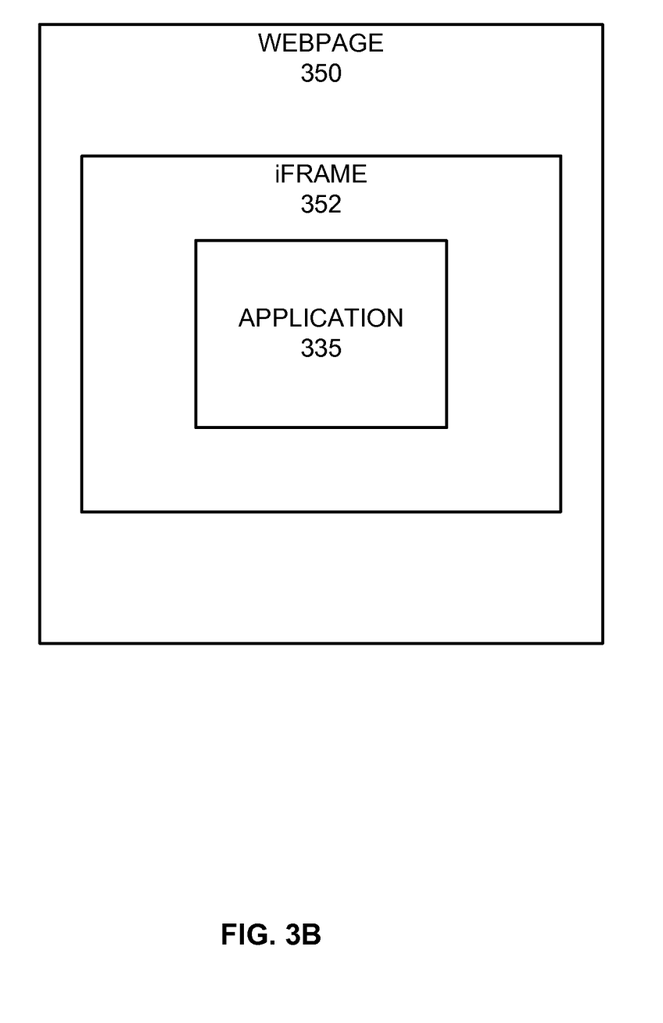
FIG. 3B shows an example block diagram of a webpage.

In greater detail, the client computer 310 requests a webpage 350 from the publisher web server 320. The publisher web server 320 serves the webpage 350 for rendering in a browser 355 on the client computer 310. Referring briefly to FIG. 3B, an example of the webpage 350 is shown. The webpage 350 includes an iFrame 352, which may be located in a portion of the webpage 350 reserved for displaying an advertisement. The iFrame 352 acts as a container, or placeholder, for content and the iFrame 352 includes a reference (e.g., a uniform resource locator (URL)), or a pointer, to the ad container 333 and the application 335 on the advertising server 330. Through the reference to the ad container 333 and the application 335, the iFrame 352 obtains and renders the ad container and the application.

Therefore, referring again to FIG. 3A, the application 335 is downloaded to the client computer 310 along with the advertising container 333 and the webpage 350, and the application 335 is executed on the client computer 310.

The application 335 may be, for example, a shockwave application, a Java script, or a Java applet. The application 335 may be compiled with a URL associated with an advertisement that is included in the advertising campaign. This advertisement may be referred to as the standard advertisement. In some implementations, the application 335 also may be compiled with an identifier of the advertising campaign and with a URL associated with a control advertisement. In some implementations, the URLs associated with the advertisement and the identifier of the advertising campaign are passed to the application 335 rather than being compiled with the application 335.

In some implementations, rather than being compiled with the application 335 or passed to the application 335, the URLs are included with the advertising container 333. In these implementations, the application 335 is responsible for determining the group in which the client computer 310 belongs and instructing the container 333 as to which group the client computer belongs but the application 335 does not provide additional information regarding an advertisement to display on the client computer 310.

Figure 4:
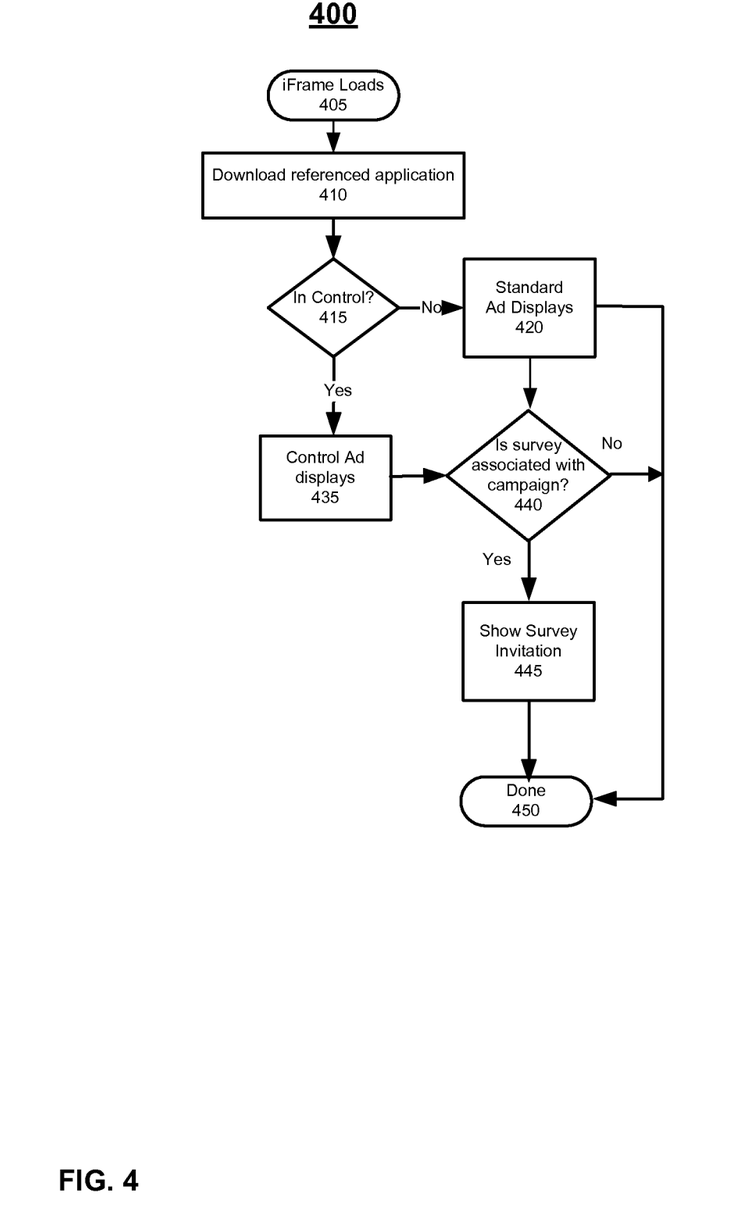
FIG. 4 shows an example process for determining a control group of webpage visitors.

As discussed in more detail with respect to FIG. 4, the application 335 determines whether the client computer 310 is in the control group using an identifier 353 that is associated with the client computer 310 and control rules 357 encoded as part of the application 335. The identifier 353 distinguishes the client computer 310 from among other client computers included in a panel of client computers. Installed on each of the client computers included in the panel of client computers is a panel application 358, and the identifier 353 may be an identifier of the panel application 358 installed on the client computer 310. The panel application 358 may collect information about requests and response and send that information to a collection server, as described in more detail with respect to FIG. 5.

The rules 357 include logic for determining whether a client computer having an identifier 353 with particular characteristics is a member of the control group. The rules 357 define parameters for defining the control group. For example, there may be a desired amount of client machines to be included in the control group, and the rules 357 may define parameters such that the desired amount of client computers are selected for inclusion in the control group. The desired amount of client computers may be, for example, expressed as a percentage of the total number of client machines expected to be exposed to the standard advertisement. The desired amount of client computers may be expressed as a number of client computers.

For example, the client computer may make a request for www.abcdef.com, which is part of an advertising campaign whose effectiveness is to be assessed. In this example, the client computer may be associated with the identifier "0BNR$%," which may be an identifier of the panel application installed on the client computer. In this example, the first character of the identifier associated with the client machines is a digit between "0" and "9," and the first digit is equally likely to be any of the numbers between "0" and "9." If the rules 357 specify that twenty percent of the client computers in the panel are to be included in the control group for the advertising campaign that includes the URL www.abcdef.com, selection of client computers having an identifier that begins with either a "0" or a "1" results in twenty percent of the client computers being in the control group. Thus, in this example, the client computer with the identifier "0BNR$%" is included in the control group.

To cause presentation of the appropriate advertisement on the client computer 310, the application 335 interacts with an advertising container 333. In particular, the application 335 instructs the advertising container 333 and tells the advertising container 333 the group (e.g., control group or non-control group) to which the client computer 310 belongs. In some implementations, the advertising container 333 calls the application 335 and the application 335 returns to the advertising container 333 a value, or some other indicator, which indicates the group to which the client computer 310 belongs. The advertising container 333 then displays an advertisement that is predetermined for that group. For example, if in the client computer 310 is in the control group, the advertising container 333 displays the control advertisement. If the client computer 310 is not in the control group, the advertising container 333 displays the standard advertisement. The advertising container 333 may include precompiled standard advertisements and control advertisements that are built into the advertising container 333 or the advertising container 333 may include URLs that reference standard advertisements and URLs that reference control advertisements. In some implementations, the advertising container 333 receives the URLs from the application 335.

The control server 340 includes a repository 344. Client computers who are included in the control group are shown an alternate, or control, advertisement rather than the standard advertisement. The alternate advertisement may be stored on the control server 340 (thus, the URLs that reference the alternative, or control, advertisement may reference the control server 340). In some implementations, the alternate advertisement may be stored on the advertising server 330 (thus, in these implementations, the URLs that reference the alternative advertisements may reference the advertising server 33). The repository 344 also may include surveys associated with particular campaign identifiers.

The repository 344 may be implemented on any type of machine-readable medium capable of storing data, including instructions that cause a processing device to perform operations. The repository 344 may be, for example, a relational database that logically organizes data into a series of database tables. The data stored in the repository 344 may, for example, include data identifying the client computer 310, data identifying one or more users of the client computer 310, data identifying the type of browser 355 on the client computer 310, an identifier of the standard advertisement, one or more alternate advertisements, and IP addresses obtained from requests made by the client computer 310. The repository 344 may be, for example, an object-oriented database that logically or physically organizes data into a series of objects. Each object may be associated with a series of attribute values. The repository 344 also may be a type of database management system that is not necessarily a relational or object-oriented database. For example, a series of XML files or documents may be used, where each XML file or document includes attributes and attribute values. Although the repository 344 is shown in FIG. 3A as being integrated with the control server 340, this is not necessarily the case in other implementations. For example, the repository 344 may be located on a central server that exchanges data with the control server 340.

Referring to FIG. 4, an example process 400 is shown. The example process 400 may be used to maintain a control group and determine the effectiveness of an advertising campaign. The process 400 may be performed by a processor included on a client computer, such as the client computer 310 discussed above with respect to FIG. 3A. Portions of the process 400 also may be performed by a processor included on a server that is separate from the client computer. For example, portions of the process 400 may be performed by a processor included in the advertising server 330 and/or the control server 340, both of which are discussed above with respect to FIG. 3A.

An inline frame ("iFrame") loads (405). The iFrame may be similar to the iFrame 352 discussed above with respect to FIG. 3A. The iFrame is loaded within a webpage, such as the webpage 350 discussed above with respect to FIG. 3A, that is rendered on a user's computer in response to a request made by the user for a webpage located at a publisher web server. The webpage requested by the user is rendered by a browser application running on the user's computer, and the rendered webpage includes the iFrame. The iFrame may include a reference to a content source, such as an advertising server, and may particularly point to an object, such as an ad container and/or application (e.g., container 333 and/or application 335) that is used to help maintain the control group. Such an application or object may be referred to as a referenced application or a referenced object.

The referenced application is downloaded to the client computer (410). An advertising container, such as the advertising container 333 discussed above with respect to FIG. 3A, may be downloaded with the referenced application. The referenced application is rendered in the iFrame included in the rendered webpage, and the referenced application is executed on the user's computer. The referenced application may be a shockwave application, and the shockwave application may be compiled with the URL of a standard advertisement, the URL for a control advertisement, and a campaign ID. In some implementations, the URL of the standard advertisement and/or the URL for the control advertisement may be passed to the shockwave application. Instead of retrieving the standard advertisement for display in the portion of the webpage that includes the iFrame, the referenced application is executed on the user's computer and renders content in the portion of the webpage that includes iFrame. As discussed below, the content rendered by execution of the referenced application may be the standard advertisement or may be a control advertisement.

Whether the client computer is a member of the control group is determined (415). There may be a desired amount of client computers to be included in the control group. The desired amount of client computers may, for example, be expressed as a percentage of the total number of client computers expected to be exposed to the standard advertisement.

In some implementations, the desired amount of client computers may be expressed as a number of client computers.

In some implementations, to determine whether the client machine is a member of the control group, the referenced application (such as the application 335 discussed above in FIG. 3A), accesses an identifier associated with the client machine (such as the identifier 353 discussed above in FIG. 3A) and compares the identifier to pre-defined rules (such as control rules 357) used to categorize the client machine as a member or non-member of the control group. For example, the identifier associated with the client machine may be a character string that includes numbers, symbols, and/or letters. Each of the characters included in the unique identifier may be determined based on a known distribution of characters available for inclusion in the unique identifier. For example, the first character of the unique identifier may be a number between "0" and "9," with the occurrence of any number between "0" and "9" being equally likely. In one example, the desired amount of client computers to include in the control group may be 20% of expected viewers of an advertisement and the first character of the unique identifier is a number between "0" and "9." To select 20% of expected viewers of an advertisement, client computers associated with unique identifiers that have a "0" or a "1" as the first character are selected by the control application 356 as members of the control group.

If the client computer is not a member of the control group, the referenced application instructs the advertising container (such as the advertising container 333) to display a standard advertisement. The standard advertisement is displayed (420). The standard advertisement may be displayed in the iFrame. If the client computer is in the control group, the referenced application instructs the advertising container to display a control advertisement. The control advertisement is displayed (435). The control advertisement may be displayed in the iFrame.

The repository is accessed to determine whether a survey is associated with the campaign ID associated with the advertisement that is displayed in the iFrame (440). If there is not a survey associated with the advertisement, the process 400 terminates (450). If there is a survey associated with the advertisement, whether a survey quota has been satisfied is determined. For example, the survey quota may be satisfied when a threshold number of users has completed the survey or a predetermined percentage of users has completed the survey. If the survey quota has not been satisfied, a response is sent from the repository to the referenced application including the survey and indicating that the survey is to be shown with the advertisement.

The survey may be displayed adjacent to the advertisement (e.g., the survey may appear below the advertisement, on either side of the advertisement, or on the advertisement). The survey may be displayed after the advertisement is displayed in order to allow the user to focus attention on the advertisement and form an opinion prior to completing the survey. For example, the display of the survey may occur 4-5 seconds after the display of the advertisement. In this manner, the user views the advertisement without interference with the appearance of the survey. In some implementations, if the quota has not been satisfied, an invitation to participate in the survey is shown (445). In some implementations, the survey is shown only if the invitation is accepted by the user, although in other implementations, the survey is shown with the advertisement regardless of whether the invitation is displayed and/or selected. The user may be given the option to dismiss the survey rather than complete the survey in some implementations. Similarly, a survey may be provided to users that receive the standard advertisement.

In some implementations, the invitation to participate in the survey is shown only if the client computer is in the control group, and in some implementations, the invitation to participate is shown only if the client computer is not in the control group. In some implementations, the invitation to participate is shown to the client computer regardless of whether the client computer is in the control group or not in the control group. Additionally, the survey may be shown or not shown on the client computer regardless of whether an invitation to participate is presented.

Figure 5:
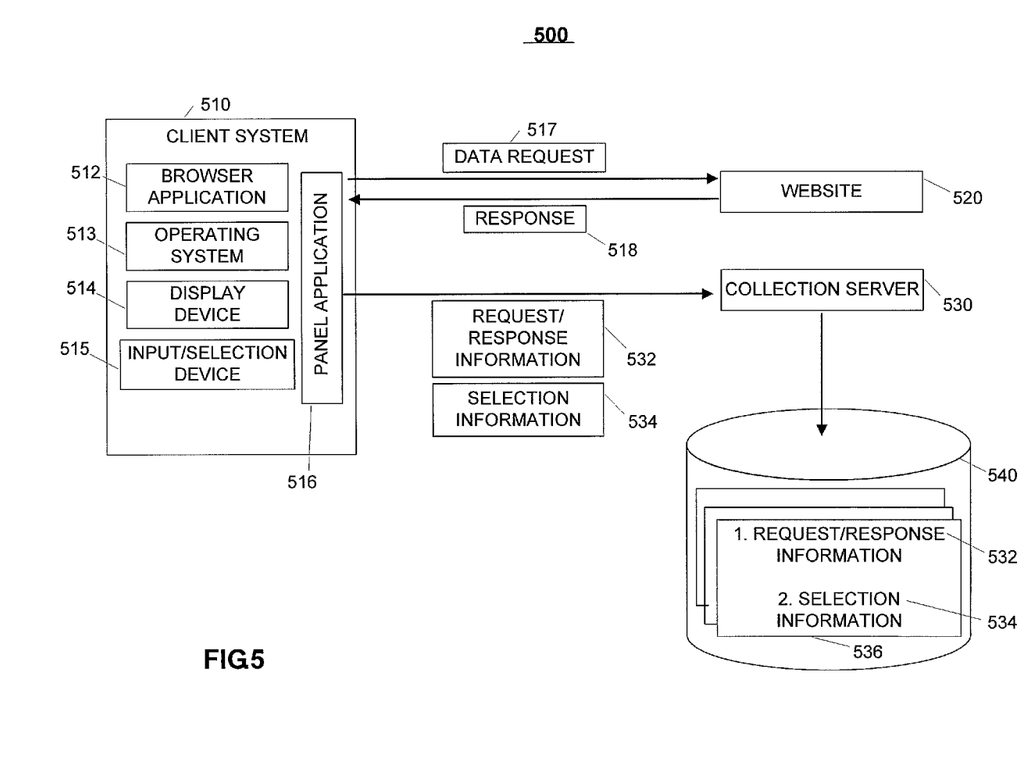
FIG. 5 illustrates an example of a system that generally provides for the collection and analysis of data regarding the use of web resources by, for example, a panel of computer users.

Referring to FIG. 5, an example of a system 500 that provides for the collection and analysis of data regarding the use of web resources by, for example, a panel of computer users is shown. The collection and analysis of this data may yield analytics regarding the habits of users viewing webpages or other network content.

In particular, the data collection system 500 includes a client system 510, a website 520, and a collection server 530. The client system 510 is capable of communicating with the website 520 and the collection server 530 over a network such as, for example, the Internet. The client system 510 may be similar to the client computer 110 discussed above with respect to FIG. 1A or the client computer 310 discussed above with respect to FIG. 3A. The client system 510 requests data from a website 520 and receives data from the website 520. The client system 510 also sends data to a collection server 530. The collection server 530 stores data received from the client system 510 in the information store 537. The requests for data may be the data request 517 and the received data may be the requested data 518.

More specifically, the client system 510 includes a browser application 512, an operating system 513, a display device 514, an input/selection device 515 (e.g., a mouse, a keyboard, or a stylus), and a local panel application 516. The browser application 512 may be similar to the browser 155 discussed above with respect to FIG. 1A or the browser 355 discussed with respect to FIG. 3A.

The browser application 512 displays web pages received at the client system 510 on the display device 514. The local panel application 516 has access to the network traffic sent from and received by the client system 510. The local panel application 516 also communicates with the collection server 530. In particular, the local panel application 516 sends web page information 534 to the collection server 530. The web page information 534 may include, for example, the source URL of a web page component, a link URL associated with the web page component, and a unique identifier associated with the web page component (such as a hash). The web page information 534 may include additional information depending on the type of component. For example, for web page components that include images, the web page information 534 may include the height and width of the image.

The collection server 530 receives the web page information 534. The collection server 530 aggregates the web page information 534 with a web page information aggregator 535 (which may aggregate such information from multiple client systems).

In the example data collection system 500 shown in FIG. 5, there is one collection server 530. However, in other implementations, there may be many collection servers 530. Additionally, in the example shown in FIG. 1, the information store 537 is a component of the collection server 530, though this is not necessarily the case. In some implementations, the information store 536 may be separate from the collection server 530. Additionally, some implementations may have more than one information store 537.

Figure 6:
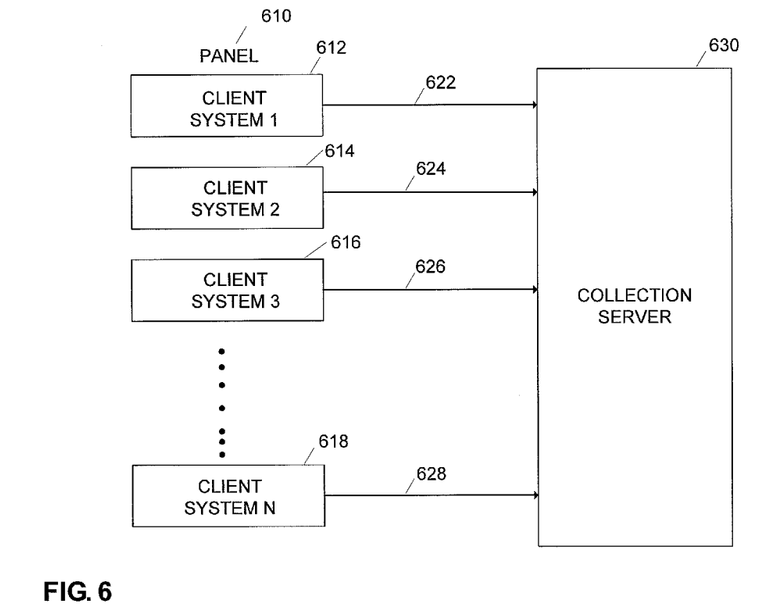
FIG. 6 illustrates a system in which a panel of computer users transmit data to a collection server.

Referring to FIG. 6, a panel of computer users 610 transmit data to a collection server 630. The panel of users 610 may be a group of users that are representative of a larger group of users. For example, the panel of users 610 may be composed such that the panel reflects an average Internet user. In another example, the panel of users 610 may be composed of users belonging to one or more demographic groups of interest to providers of goods and services.

In the example shown in FIG. 6, the panel of users 610 includes client systems 612, 614, 616, and 618. However, in other implementations, the panel 610 may be composed of more or fewer client systems. Each of the client systems 612, 614, 616, and 618 may be similar to the client computer 110 described above with respect to FIG. 1A, the client computer 310 described above with respect to FIG. 3A, or the client system 510 described above with respect to FIG. 5. In particular, each of the client systems 612, 614, 616, and 618 includes the browser application 512, the input/selection device 515, and the local panel application 516. Thus, each of the client systems 612, 614, 616, and 618 sends data 622, 624, 626, and 628, respectively, to the collection server 630 where the data 622, 624, 626, and 628 is stored and processed. The data 622, 624, 626, and 628 may be, for example, the web page information 534 described above with respect to FIG. 5.

The collection server 630 may be similar to the collection server 530 described above with respect to FIG. 5. For example, the collection server 530 may include an information store 536 to store the data 622, 624, 626, and 628. In the example shown in FIG. 6, there is one collection server 630. However, in other implementations there may be more than one collection server 630. For example, each of the client systems 612, 614, 616, and 618 may send data 622, 624, 626, and 628 to more than one collection server for redundancy. In other implementations, the client systems 612, 614, 616, and 618 may send data 622, 624, 626, and 628 to different collection servers. In this implementation, the data 622, 624, 626, and 628, which represents data from the entire panel, may be communicated to and aggregated at a central location for later processing. In this implementation, the central location may be one of the collection servers.

When the members of the panel visit and view web pages (for example, while browsing the Internet using a browser application such as the browser application 512), information about these visits are sent to the collection server 430 and may later be analyzed to determine the visitation of other habits of the users, which may be extrapolated to a larger population of users.

The techniques can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Also, although an identifier associated with a client computer has been described as being used to determine if the client computer is in the control group, other techniques for segmenting client computers into control and non-control groups may be employed. For example, any data that provides some indicia of uniqueness of the client computer and is segmentable may be used to segment the panel of client computers into a control group and a non-control group. In some implementations, the indicia of uniqueness is a value or parameter that does not change over time or that changes only slightly over time.

Accordingly, other implementations are within the scope of the following claims.

What is claimed is:

1. A computer implemented method for a control application executed by a processor configured to modify a request for data generated by a client computer that is directed to a server hosting the data, the method comprising:

accessing, by the processor, the request for data generated by the client computer that is directed to the server hosting the data, the request for data including a resource location;

identifying, by the processor, the resource location in the accessed request for data from the client computer;

identifying, by the processor, an advertising campaign associated with the identified resource location by comparing the identified resource location to a list of resource locations associated with one or more advertising campaigns, the one or more advertising campaigns including standard advertisements associated with the advertising campaigns;

accessing, by the processor, rules associated with the identified advertising campaign, the rules defining a control group of client computers;
applying, by the processor, the accessed rules that defining the control group and that are associated with the identified advertising campaign to an identifier associated with the client computer to determine whether the client computer is included in the control group;
modifying, by the processor, the request for data to add one of a first control parameter and a second control parameter to the request based on the determination whether the client computer is in the control group including:
adding the first control parameter indicating that the client computer receives a control advertisement that is not associated with the identified advertising campaign when the processor determines that the client computer is in the control group; and
adding the second control parameter indicating that the client computer receives a standard advertisement associated with the identified advertising campaign when the processor determines that the client computer is not in the control group; and
transmitting, from the processor, the modified request for data to the server the accessed request was directed to.

2. The method of claim 1, wherein the identifier associated with the client computer is an identifier generated by an application running on the client computer and the identifier is constant over time.

3. The method of claim 1, wherein accessing, by the processor, a request includes accessing a request directed to an advertising server configured to determine, based on the first or second control parameter, whether the client computer is in the control group.

4. The method of claim 1, wherein the resource location is a uniform resource locator associated with an advertising server.

5. The method of claim 1, wherein accessing, by the processor, a request for data generated by a client computer comprises accessing the request for data by a control application that is local to the client computer.

6. The method of claim 1, wherein accessing, by the processor, a request for data generated by a client computer comprises accessing the request for data at a processor remotely located from the client computer.

7. A system comprising:
two or more client computers, the client computers comprising:
a control application configured to:
access a request for data directed to an advertising server from a client computer, the request for data including a resource location,
identify the resource location in the accessed request for data,
identify an advertising campaign associated with the identified resource location by comparing the identified resource location to a list of resource locations associated with one or more advertising campaigns, the one or more advertising campaigns including standard advertisements associated with the advertising campaigns,
access rules associated with the identified advertising campaign, the rules defining a control group of client computers,
apply the accessed rules defining the control group to an identifier of the client computer to determine whether the client computer is included in the control group, and
modify the accessed request for data to include a control parameter indicating whether the client computer is in the control group,
forward the modified request to the advertising server; and
an advertising server configured to:
receive the modified request for data from the client computer,
identify the control parameter in the modified request for data,
return a control advertisement not associated with the advertising campaign to the client computer when the control parameter indicates that the client computer is included in the control group, and
return a standard advertisement that is associated with the advertising campaign to the client computer when the control parameter indicates that the client computer is not included in the control group.

8. A computer implemented method for a control application executed by a proxy server configured to modify a request for an advertisement generated by a client computer, the method comprising:
intercepting, by the proxy server, the request for an advertisement including a resource location from the client computer that is directed an advertising server, the request intercepted from the client computer including a resource location;
identifying, by the proxy server, the resource location in the intercepted request;
identifying, by the proxy server, an advertising campaign associated with the resource location identified from the intercepted request, by comparing the identified resource location to a list of resource locations associated with one or more advertising campaigns, the one or more advertising campaigns including standard advertisements associated with the advertising campaigns;
accessing, by the proxy server, rules associated with the identified advertising campaign, the rules defining a control group of client computers for the identified advertising campaign;
determining, by the proxy server, whether the client computer is included in the control group by applying the rules defining the control group to an identifier associated with the client computer;
modifying, by the proxy server, the intercepted request to add one of a first control parameter and a second control parameter to the intercepted request according to the determination whether the client computer is in the control group including:
adding the first control parameter to the intercepted request indicating that the client computer receives a control advertisement that is not associated with the identified advertising campaign when the processor determines that the client computer is in the control group; and
adding the second control parameter to the intercepted request indicating that the client computer receives a standard advertisement associated with the identified advertising campaign when the processor determines that the client computer is not in the control group; and
forwarding, by the proxy server, the intercepted request that has been modified with the added control parameter to the advertising server.

9. The method of claim 8 wherein the proxy server is a local proxy operating on the client computer.

10. The method of claim 9 wherein the remote, transparent proxy server is provided by an Internet Service Provider (ISP) through which the client computer connects to a network.

11. The method of claim 8 wherein the proxy server is a remote, transparent proxy server.

\* \* \* \* \*